United States Patent
Saito

(10) Patent No.: US 8,180,390 B2
(45) Date of Patent: May 15, 2012

(54) MOBILE COMMUNICATION TERMINAL, MOBILE COMMUNICATION MANAGING APPARATUS, MOBILE COMMUNICATION SYSTEM, COMPUTER READABLE MEDIUM FOR MOBILE COMMUNICATION AND MOBILE COMMUNICATION METHOD

(75) Inventor: Masahiro Saito, Yokohama (JP)

(73) Assignee: Kyocera Corporation, Kyoto (JP)

( * ) Notice: Subject to any disclaimer, the term of this patent is extended or adjusted under 35 U.S.C. 154(b) by 734 days.

(21) Appl. No.: 10/577,703

(22) PCT Filed: Oct. 15, 2004

(86) PCT No.: PCT/JP2004/015642
§ 371 (c)(1),
(2), (4) Date: Dec. 12, 2006

(87) PCT Pub. No.: WO2005/041499
PCT Pub. Date: May 6, 2005

(65) Prior Publication Data
US 2007/0225032 A1      Sep. 27, 2007

(30) Foreign Application Priority Data
Oct. 29, 2003   (JP) ............................... P2003-369163

(51) Int. Cl.
*H04Q 7/00* (2006.01)
(52) U.S. Cl. .................... 455/552.1; 370/338
(58) Field of Classification Search ............... 455/552.1, 455/443
See application file for complete search history.

(56) References Cited

U.S. PATENT DOCUMENTS

| | | | | |
|---|---|---|---|---|
| 5,428,666 | A | * | 6/1995 | Fyfe et al. ........................ 455/551 |
| 5,860,136 | A | * | 1/1999 | Fenner ............................ 711/201 |
| 6,125,282 | A | * | 9/2000 | Urabe ........................... 455/552.1 |
| 6,442,616 | B1 | * | 8/2002 | Inoue et al. ..................... 709/245 |
| 2002/0080778 | A1 | * | 6/2002 | Matsugatani et al. ......... 370/352 |
| 2002/0164983 | A1 | * | 11/2002 | Raviv et al. ..................... 455/432 |
| 2005/0119001 | A1 | * | 6/2005 | Watanabe ...................... 455/436 |

FOREIGN PATENT DOCUMENTS

| | | |
|---|---|---|
| EP | 1189405 A1 | 3/2002 |
| JP | 2002-199426 | 7/2002 |
| JP | 2002-290445 | 10/2002 |

(Continued)

OTHER PUBLICATIONS

Xinhua Zhao et al., "Flexible Network Support for Mobile Hosts" Mobile Networks and Applications, vol. 6, No. 2, pp. 137-149, Mar. 1, 2001.

(Continued)

*Primary Examiner* — Dwayne Bost
*Assistant Examiner* — Joseph Dean, Jr.
(74) *Attorney, Agent, or Firm* — DLA Piper LLP (US)

(57) ABSTRACT

It is an object of the invention to realize effective communication by a mobile communication terminal having a plurality of communication interfaces.

When transmitting data, a mobile communication terminal (100) selects a communication interface (102). The mobile communication terminal (100) transmits the data via a communication network (108) corresponding to the selected communication interface (102) to a mobile communication managing apparatus (200). The mobile communication managing apparatus (200) transfers the data to a communication apparatus (500). The mobile communication terminal (100) assigns a terminal identification address for uniquely identifying the mobile communication terminal (100) and a communication interface identification address for identifying the communication interface (102) that is valid in the communication network (108) to the transmission data.

9 Claims, 7 Drawing Sheets

FOREIGN PATENT DOCUMENTS

| | | |
|---|---|---|
| JP | 2002-300644 | 10/2002 |
| JP | 2004-304399 | 10/2004 |

OTHER PUBLICATIONS

Ryuji Wakikawa et al., "Multiple Care-of Addresses Registration draft-wakikawa-mobileip-multiplecoa-02.txt" IETF Standard-Working-Draft, Internet Engineers Task Force, CH, No. 2 pp. 1-27, Sep. 20, 2003.

David Lee, et al., "Mobile IP<2>" 2001 IEEE Pacific Rim Conference on Communications, Computers and Signal Processing, Victoria B.C., vol. 2, No. 26, pp. 345-349, Aug. 26, 2001.

European search report for corresponding European application 04773810.9 lists the references above, Jan. 12, 2010.

* cited by examiner

FIG. 6

| TERMINAL NUMBER 232 | TERMINAL IDENTIFICATION ADDRESS 234 | COMMUNICATION INTERFACE IDENTIFICATION ADDRESS 1 236 | COMMUNICATION INTERFACE IDENTIFICATION ADDRESS 2 238 | COMMUNICATION INTERFACE IDENTIFICATION ADDRESS 3 240 |
|---|---|---|---|---|
| 1 | 10.1.1.1 | 168.1.1.6 | 133.1.1.1 | 192.1.1.1 |
| 2 | 10.1.1.2 | 168.1.1.2 | 133.1.1.2 | 192.1.1.2 |
| 3 | 10.1.1.3 | 168.1.1.3 | — | 192.1.1.3 |
| 4 | 10.1.1.4 | 168.1.1.4 | 133.1.1.4 | 192.1.1.4 |
| 5 | 10.1.1.5 | 168.1.1.5 | 133.1.1.6 | — |
| ... | ... | ... | ... | ... |

136

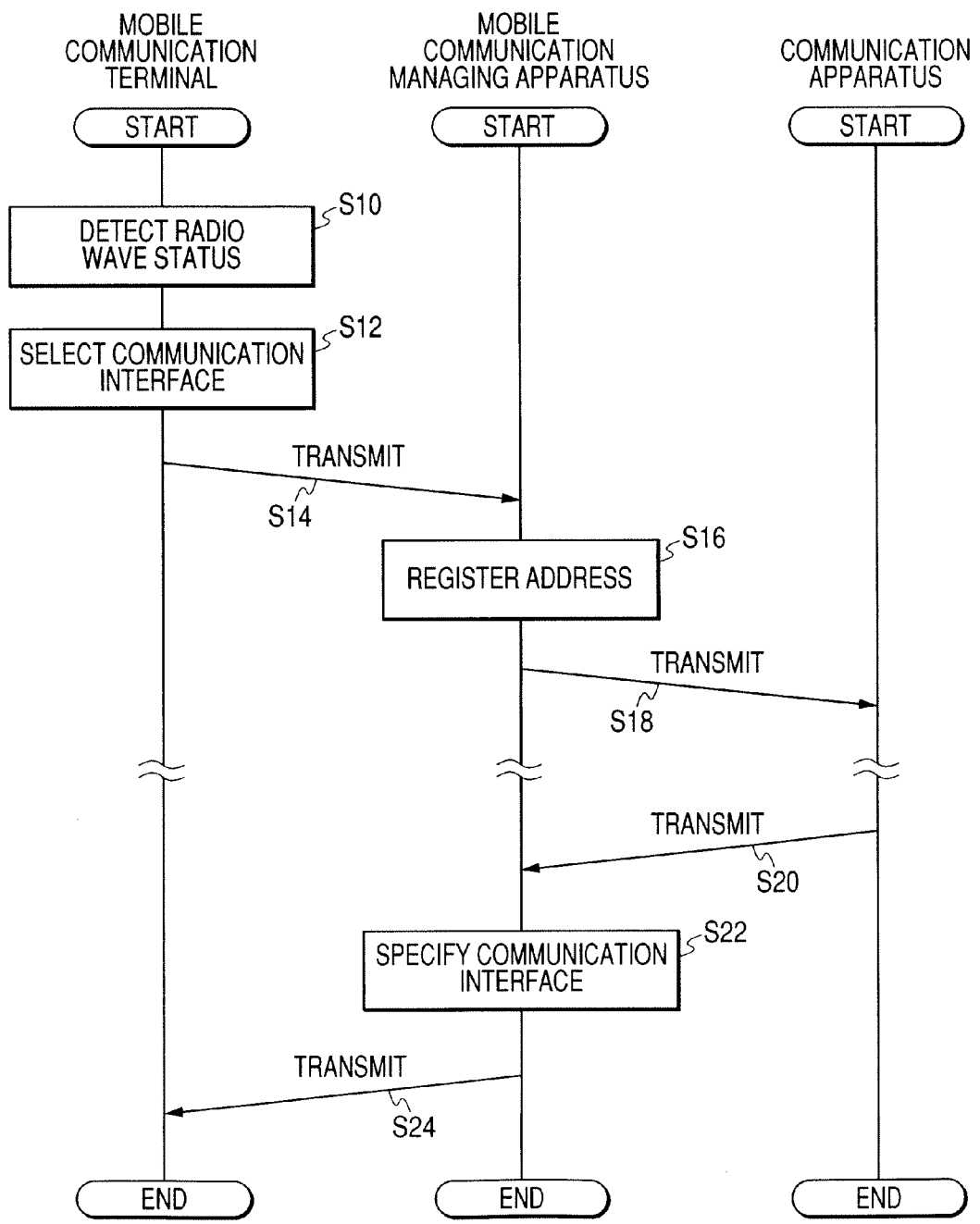

MOBILE COMMUNICATION TERMINAL, MOBILE COMMUNICATION MANAGING APPARATUS, MOBILE COMMUNICATION SYSTEM, COMPUTER READABLE MEDIUM FOR MOBILE COMMUNICATION AND MOBILE COMMUNICATION METHOD

TECHNICAL FIELD

The present invention relates to a technology for mobile communication, in particular, to a technology for allowing a mobile communication terminal having a plurality of communication interfaces to select a predetermined communication interface and to perform communication.

BACKGROUND ART

In recent years, CDMA 2000 1X-EV DO (hereinafter, referred to as 'EV-DO') system has been developed as a high-speed wireless communication system of next generation. The CDMA 2000 1X system, in which the CDMA One system is extended so as to correspond to a third-generation system, has been further specialized for data communication to speed up a transmission rate, thereby constructing the EV-DO system. Here, the term 'EV' stands for 'evolution' and the term 'DO' stands for 'data only'. Generally, a mobile communication system has been built up for a voice call by using a mobile phone, a car-phone, and a personal handy phone system. At present, a data communication system is used for general data communication including a portable computer such as a PDA (Personal Digital Assistance). A wireless communication network which has been connected to a conventional wired telephone network, and of which service area has been rapidly enlarged has become a social infrastructure.

Further, a communication band of a wireless communication network such as a wireless LAN (Local Area Network) has been enlarged.

(Patent Document 1) JP-A-2002-300644

When a mobile communication terminal belongs to any communication network, the mobile communication terminal is generally assigned with an IP (Internet Protocol) address from an access point or a base station which manages the communication network. The assigned IP address is valid as long as the mobile communication terminal belongs to the communication network. When the mobile communication terminal belongs to another communication network, the mobile communication terminal is assigned with an IP address valid in the newly belonging communication network.

Accordingly, in order to perform data transmission from a communication apparatus to a mobile communication terminal, it is necessary to specify a communication network to which the mobile communication terminal as a communication target currently belongs. This is because an IP address for specifying the mobile communication terminal is determined by the communication network to which the mobile communication terminal belongs.

A communication protocol called as a mobile IP has been designed and put to practical use so as to cope with the problems peculiar to the mobile communication. According to the mobile IP, the communication apparatus can perform communication regardless of the communication network to which the mobile communication terminal to be a destination of data transmission currently belongs.

However, the mobile IP is a communication protocol which has been designed based on a single communication interface. Hence, a mobile communication terminal which has a plurality of communication interfaces for accessing various communication networks such as mobile phones or wireless LANs will be generalized. For example, a mobile communication terminal normally performs communication via a wireless LAN which is a communication network to which the mobile communication terminal belongs. Alternatively, when the mobile communication terminal does not belong to the area of the wireless LAN, the mobile communication terminal may perform communication via a mobile phone network. The mobile IP does not include logic for causing the mobile communication terminal having the plurality of communication interfaces to provide its functions.

The invention has been made in consideration of the above-described problems, and it is an object of the invention to provide a technology which allows a mobile communication terminal to select one of a plurality of communication interfaces and to perform mobile communication.

DISCLOSURE OF THE INVENTION

1. A mobile communication terminal of the invention comprises: a plurality of communication interfaces; a communication interface selecting section which selects a communication interface for transmitting data from the plurality of communication interfaces; a terminal identification address assigning section which assigns a terminal identification address for identifying the mobile communication terminal to the data; a communication interface identification address assigning section which assigns a communication interface identification address for identifying the selected communication interface to the data; and a transmitting section which transmits the data being assigned with the two kinds of addresses via the selected communication interface.

2. The mobile communication terminal of the invention further comprises a radio wave monitoring section which monitors a status of radio wave reception at a current location, wherein the communication interface selecting section selects the communication interface in accordance with the monitored status of the radio wave reception.

3. A mobile communication managing apparatus of the invention comprises: a mobile communication terminal side receiving section which receives data that is assigned with two kinds of addresses including a mobile communication terminal identification address for identifying a mobile communication terminal and a communication interface identification address for identifying a communication interface of the mobile communication terminal; an address storing section which stores an address table in which the mobile communication terminal identification address and the communication interface identification address that are assigned to the received data are associated with each other; a communication apparatus side transmitting section which transmits the data received by the mobile communication terminal side receiving section to a certain destination; a communication apparatus side receiving section which receives data being assigned with a mobile communication terminal identification address; a communication interface detecting section which detects a communication interface identification address that corresponds to the mobile communication terminal identification address being assigned to the data received by the communication apparatus side receiving section based on the address table; and a mobile communication terminal side transmitting section which transmits the data received by the communication apparatus side receiving section to the detected communication interface.

4. A mobile communication system of the invention comprises: a mobile communication terminal including: a plurality of communication interfaces; a communication interface selecting section which selects a communication interface for transmitting data from the plurality of communication interfaces; a mobile communication terminal identification address assigning section which assigns a mobile communication terminal identification address for identifying the mobile communication terminal to data; a communication interface identification address assigning section which assigns a communication interface identification address for identifying the selected communication interface to the data; and a transmitting section which transmits the data being assigned with the two kinds of addresses via the selected communication interface; and a mobile communication managing apparatus including: a mobile communication terminal side receiving section which receives the data from the mobile communication terminal; an address storing section which stores an address table in which the mobile communication terminal identification address and the communication interface identification address that are assigned to the received data are associated with each other; a communication apparatus side transmitting section which transmits the data received by the mobile communication terminal side receiving section to a certain destination; a communication apparatus side receiving section which receives data being assigned with a mobile communication terminal identification address; a communication interface detecting section which detects a communication interface identification address that corresponds to the mobile communication terminal identification address being assigned to the data received by the communication apparatus side receiving section based on the address table; and a mobile communication terminal side transmitting section which transmits the data received by the communication apparatus side receiving section via the detected communication interface.

5. In the mobile communication managing apparatus of the invention, the mobile communication terminal includes a switching informing section which transmits a switch information signal to the mobile communication managing apparatus when the communication interface selecting section selects another communication interface from the plurality of communication interfaces, the switch information signal being assigned with the mobile communication terminal identification address and a communication interface identification address corresponding to the communication interface to be newly selected, the mobile communication managing apparatus includes a switching signal receiving section which receives the switch information signal, and the address storing section stores the address table in which the mobile communication terminal identification address and the communication interface identification address that are assigned to the switch information signal are associated with each other.

6. A computer readable medium of the invention storing a program of instruction executable by a computer to perform a function for a mobile communication terminal, the function comprises the steps of: selecting a communication interface for transmitting data; assigning a terminal identification address for identifying the mobile communication terminal to the data; assigning a communication interface identification address for identifying the selected communication interface to the data; and transmitting the data being assigned with the two kinds of addresses via the selected communication interface.

7. A computer readable medium of the invention storing a program of instruction executable by a computer to perform a function for mobile communication management, the function comprises the steps of: receiving data that is assigned with two kinds of addresses including a mobile communication terminal identification address for identifying a mobile communication terminal and a communication interface identification address for identifying a communication interface of the mobile communication terminal from the mobile communication terminal; storing an address table in which the mobile communication terminal identification address and the communication interface identification address that are assigned to the received data are associated with each other; transmitting the received data to a certain destination; receiving data assigned with a mobile communication terminal identification address from a communication apparatus; detecting a communication interface identification address that corresponds to the mobile communication terminal identification address being assigned to the data received from the communication apparatus based on the address table; and transmitting the data received from the communication apparatus via the detected communication interface.

8. A mobile communication method of the invention comprising: selecting a communication interface; assigning a terminal identification address for identifying a mobile communication terminal to data; assigning a communication interface identification address for identifying the selected communication interface to the data; storing an address table in which the assigned terminal identification address and the assigned communication interface identification address are associated with each other; and transmitting the data being assigned with the two kinds of addresses to a certain destination.

9. The mobile communication method of the invention further comprises: receiving data being assigned with the terminal identification address; detecting the communication interface identification address that corresponds to the terminal identification address for identifying the mobile communication terminal based on the address table; and transmitting the received data via the detected communication interface.

As described above, the mobile communication terminal of the invention has the plurality of communication interfaces. The mobile communication terminal selects a communication interface for transmitting data from the plurality of communication interfaces, assigns the mobile communication terminal identification address for identifying the mobile communication terminal and the communication interface identification address for identifying the selected communication interface to the transmitting data, and transmits the data via the selected communication interface. The mobile communication terminal may select the communication interface in accordance with the monitoring result of the radio wave status of a connectable mobile communication network.

The mobile communication managing apparatus according to an embodiment of the invention receives the data transmitted from the mobile communication terminal. The mobile communication managing apparatus makes the mobile communication terminal identification address and the communication interface identification address that are assigned to the data received from the mobile communication terminal associate with each other, and stores them in the address storing table. Then, the mobile communication managing apparatus transmits the data to a communication apparatus of a destination. Further, when reading out the mobile communication terminal identification address assigned to data received from the communication apparatus, the mobile communication managing apparatus reads out the communication interface identification address corresponding to the mobile communication terminal identification address from the address storing table, and transmits the data to the communication interface.

According to the invention, there is an advantage in that the mobile communication terminal performs communication by using a plurality of communication interfaces.

BRIEF DESCRIPTION OF THE DRAWINGS

FIG. 6 is a diagram showing a data structure stored in an address storing section of the mobile communication terminal.

FIG. 7 is a timing chart showing a data transmission process to a communication party from the mobile communication terminal, and a data transmission process from an external communication apparatus to the mobile communication terminal.

Figure 1:
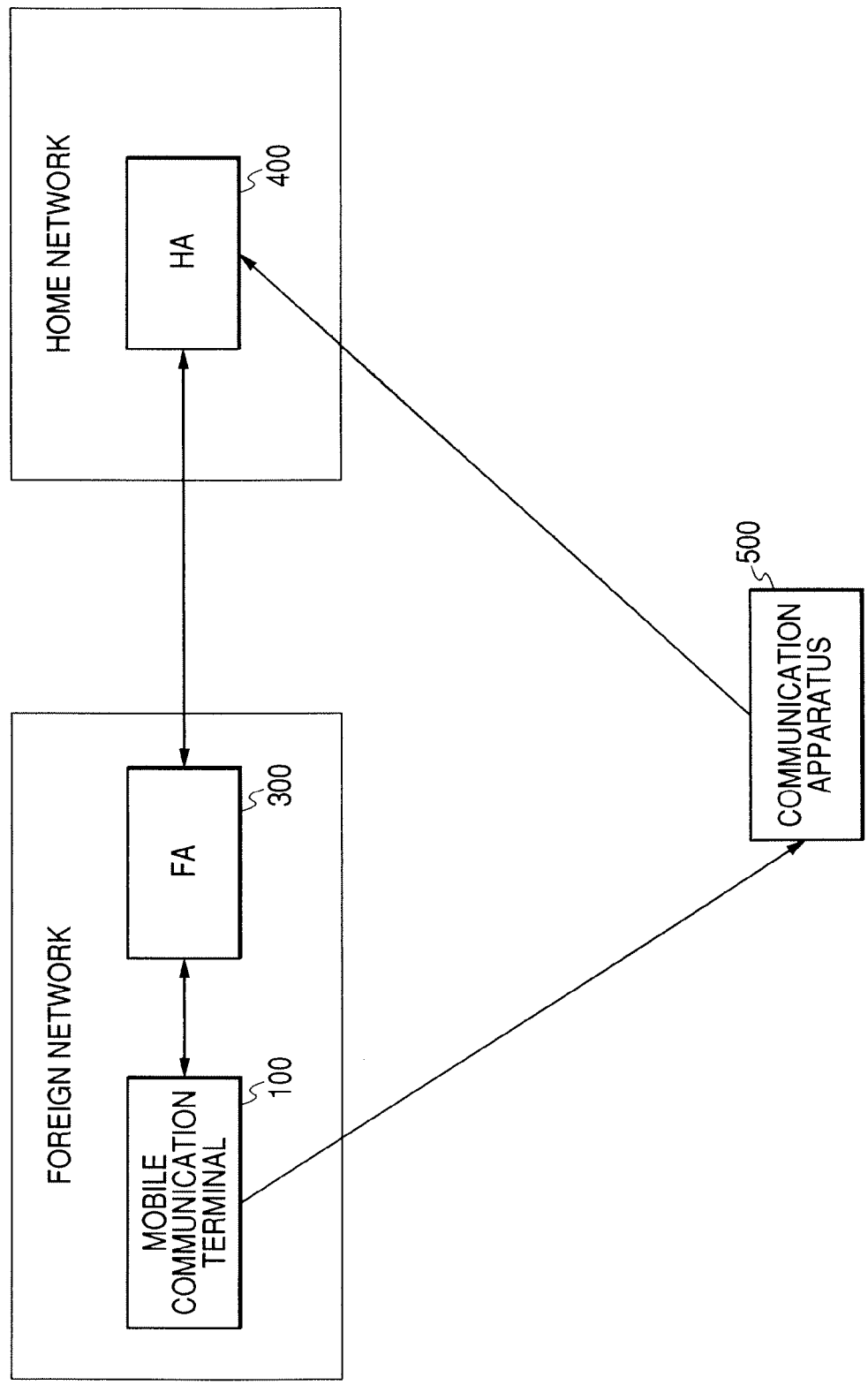
FIG. 1 is a block diagram illustrating a structure of a mobile IP.

In the drawings, reference numeral 50 denotes a mobile communication system, reference numeral 100 denotes a mobile communication terminal, reference numeral 102 denotes a communication interface, reference numeral 108 denotes a communication network, reference numeral 120 denotes a communication section, reference numeral 122 denotes a switching informing section, reference numeral 124 denotes a communication interface selecting section, reference numeral 130 denotes a storing section, reference numeral 132 denotes an address processing section, reference numeral 134 denotes a radio wave monitoring section, reference numeral 136 denotes an address storing section, reference numeral 200 denotes a mobile communication managing apparatus, reference numeral 210 denotes a communication section, reference numeral 212 denotes a switching signal receiving section, reference numeral 214 denotes a communication network selecting section, reference numeral 220 denotes an address processing section, and reference numeral 230 denotes an address storing section.

BEST MODE FOR CARRYING OUT THE INVENTION

Prior to a description of the invention, a mobile IP will be first described.

FIG. 1 is a block diagram illustrating the structure of the mobile IP. At the time of data transmission from a communication apparatus 500 to a mobile communication terminal 100, a foreign agent 300 and a home agent 400 relay data. The home agent 400 manages a communication network to which the mobile communication terminal 100 should originally belong. The home agent 400 assigns an IP address called as a home address to the mobile communication terminal 100. The foreign agent 300 manages a communication network to which the mobile communication terminal 100 currently belongs. The foreign agent 300 assigns an IP address called as a care-of address to the mobile communication terminal 100. Hereinafter, the communication network managed by the home agent 400 is referred to as a 'home network', and the communication network managed by the foreign agent 300 is referred to as a 'foreign network'.

First, the mobile communication terminal 100 needs to recognize whether the currently belonging network is a home network or a foreign network. The foreign agent 300 sends a message called as an agent advertisement at regular intervals. The mobile communication terminal 100 identifies the belonging communication network by receiving the message. The mobile communication terminal 100 may request the foreign agent 300 for the agent advertisement message.

When recognizing that the currently belonging communication network is the foreign network, the mobile communication terminal 100 transmits a message (hereinafter, called as a 'location registration request message') for requesting location registration to the foreign agent 300. The location registration request message includes the home address and the care-of address of the mobile communication terminal 100. The foreign agent 300 then transmits the location registration request message to the home agent 400. The home agent 400 registers the communication network to which the mobile communication terminal 100 currently belongs and the care-of address assigned to the mobile communication terminal 100 based on the location registration request message. The location registration is performed in the same way as described above even when the mobile communication terminal 100 moves and belongs to another foreign network. When the home agent 400 completes the location registration, the home agent 400 informs the mobile communication terminal 100 of the location registration completion via the foreign agent 300. Accordingly, the mobile communication terminal 100 recognizes that the location registration in the home agent 400 is completed. After the above-described preparations are completed, data communication is actually performed.

When the communication apparatus 500 transmits data to the mobile communication terminal 100, the communication apparatus 500 transmits the data to the home agent 400 regardless of the communication network to which the mobile communication terminal 100 belongs. That is, when the communication apparatus 500 performs communication with the mobile communication terminal 100, the communication apparatus 500 needs to know the home address of the mobile communication terminal 100 but does not need to know the care-of address of the mobile communication terminal 100. The home agent 400 detects the communication network to which the mobile communication terminal 100 currently belongs from the location registration data. When the mobile communication terminal 100 belongs to the home network, the home agent 400 transmits the data received from the communication apparatus 500 to the home address to be the destination. When the mobile communication terminal 100 belongs to the foreign network, the home agent 400 transmits the data received from the communication apparatus 500 to the foreign agent 300 with the care-of address as the destination. Then, the foreign agent 300 transmits the data to the destination of the care-of address. Accordingly, the data transmitted from the communication apparatus 500 can be correctly received by the mobile communication terminal 100 regardless of the communication network to which the mobile communication terminal 100 belongs. On the other hand, the mobile communication terminal 100 transmits the data to the communication apparatus 500 without passing through the foreign agent 300 or the home agent 400. In case that the communication apparatus 500 is a mobile communication terminal, data is transmitted via the foreign agent 300 or the home agent 400 according to the above-described method.

The mobile communication terminal 100 according to an embodiment includes a plurality of communication interfaces. The mobile communication terminal 100 may select a communication interface from various points of view such as strength of a signal received from a wireless communication network or modulation method, communication traffic, communication cost, or effective communication rate. In contrast, the above-described mobile IP does not include a structure for allowing the mobile communication terminal 100 having the plurality of communication interfaces to provide its functions.

Further, in the mobile IP, when the mobile communication terminal 100 requests the home agent 400 for the location registration, communication data packets may be discarded. In particular, when the communication environment of the communication network becomes worse because of, for example, an increase in traffic or when it takes much time for the location registration, the effect may be increased. At this time, since the communication data packets are discarded, communication efficiency becomes low and a session may be disconnected.

Figure 2:
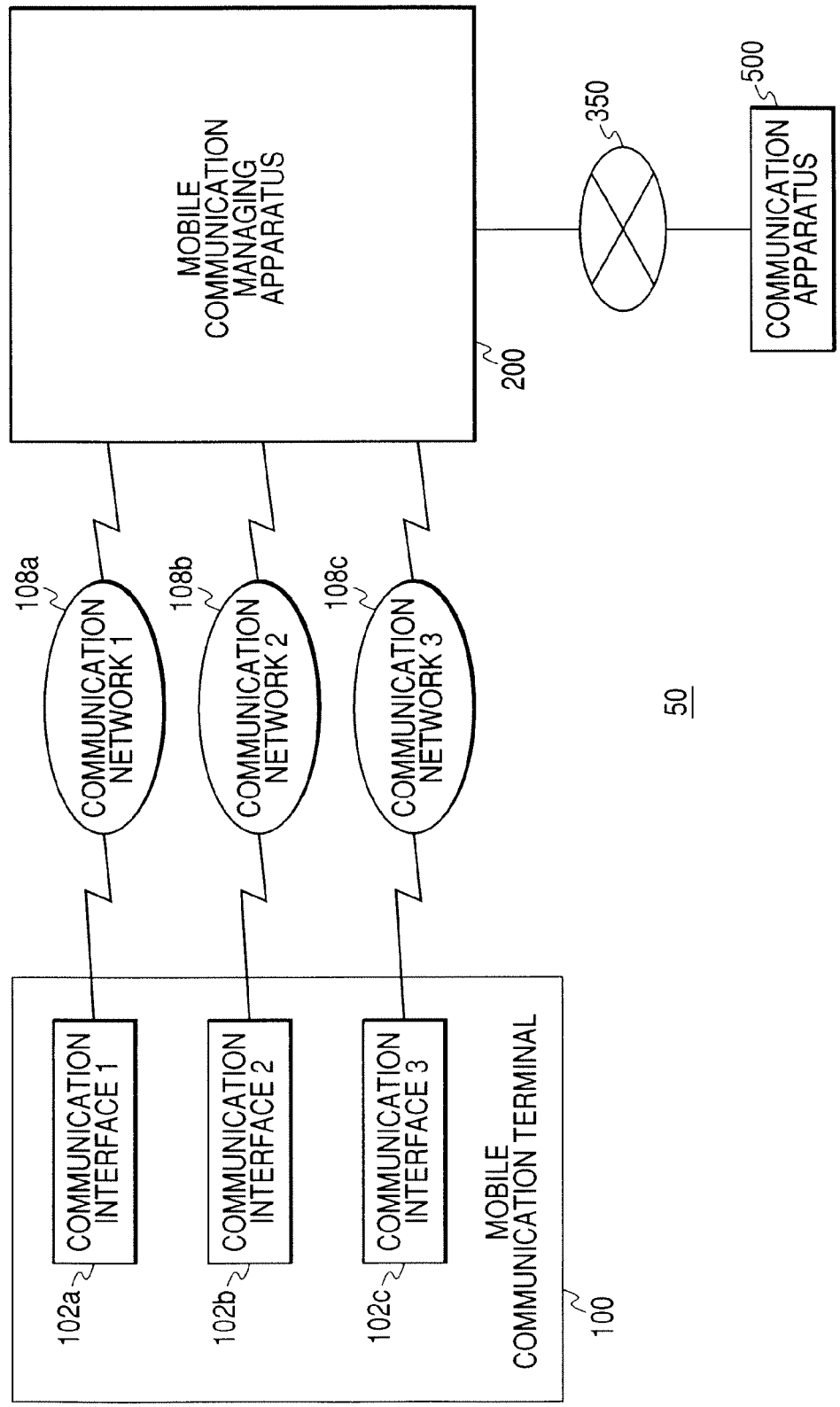
FIG. 2 is a diagram showing a hardware configuration of a mobile communication system according to an embodiment.

FIG. 2 is a diagram showing the hardware configuration of the mobile communication system 50 according to an embodiment of the invention. The mobile communication terminal 100 communicates with the communication apparatus 500 via a mobile communication managing apparatus 200. The communication apparatus 500 may be another mobile communication terminal or a fixed communication apparatus which belongs to a predetermined LAN. The mobile communication terminal 100 includes communication interfaces 102a, 102b, and 102c. Hereinafter, sometimes, the communication interfaces 102a, 102b, and 102c are collectively referred to as a 'communication interface 102'. The communication interface 102a may be a communication interface for a predetermined mobile phone. The communication interface 102b may be a communication interface for another mobile phone. The communication interface 102c may be a communication interface for the wireless LAN. Of course, the communication interfaces 102a, 102b, and 102c may be communication interfaces connected to another communication network. Here, concept of the communication interface includes, for example, not only a hardware device such as a LAN card, but also a software module such as a device driver. That is, the communication interface 102 includes a device serving as an interface to connect to a predetermined communication network.

The mobile communication terminal 100 is connected to the communication network 108a, 108b, and 108c via the communication interfaces 102. Hereinafter, sometimes, the communication networks 108a, 108b, and 108c are collectively referred to as a 'communication network 108'. The communication network 108a may be a communication area for a predetermined mobile phone. The communication network 108b may be an area for another mobile phone. Further, the communication network 108c may be a predetermined wireless LAN.

The mobile communication terminal 100 sets an IP-VPN (Virtual Private Network) to each communication network 108 located between the mobile communication terminal 100 and the mobile communication managing apparatus 200. The mobile communication managing apparatus 200 receives data from the mobile communication terminal 100 via any one of the communication networks 108. The mobile communication terminal 100 provides data with a terminal identification address for identifying the mobile communication terminal 100 and a communication interface identification address for identifying the selected communication interface 102, and transmits the data to the mobile communication managing apparatus 200. Here, the terminal identification address is not an address determined by the communication network to which the mobile communication terminal 100 belongs but a unique virtual address relative to the mobile communication terminal 100. It is preferable that the terminal identification address can identify the mobile communication terminal 100, but the terminal identification address does not necessarily need to follow a format of the IP address. In contrast, the communication interface identification address is a temporary IP address assigned in the communication network 108 to which the mobile communication terminal 100 belongs for performing communication. When the mobile communication managing apparatus 200 receives data from the mobile communication terminal 100, the mobile communication managing apparatus 200 registers the terminal identification address in association with the communication interface identification address. And then, the mobile communication managing apparatus 200 transmits data to the communication apparatus 500 to be the destination of data via Internet 350. The communication apparatus 500 acquires information regarding an address of the mobile communication terminal 100 from the terminal identification address assigned to the data.

In case that the communication apparatus 500 transmits data to the mobile communication terminal 100, the mobile communication managing apparatus 200 relays the communication apparatus 500 and the mobile communication terminal 100. The mobile communication managing apparatus 200 receives the data from the communication apparatus 500 via Internet 350. At this time, the communication apparatus 500 assigns the data with the terminal identification address, and then transmits the data. The mobile communication managing apparatus 200 transmits the data via the communication interface 102 corresponding to the assigned terminal identification address of the mobile communication terminal 100.

Figure 3:
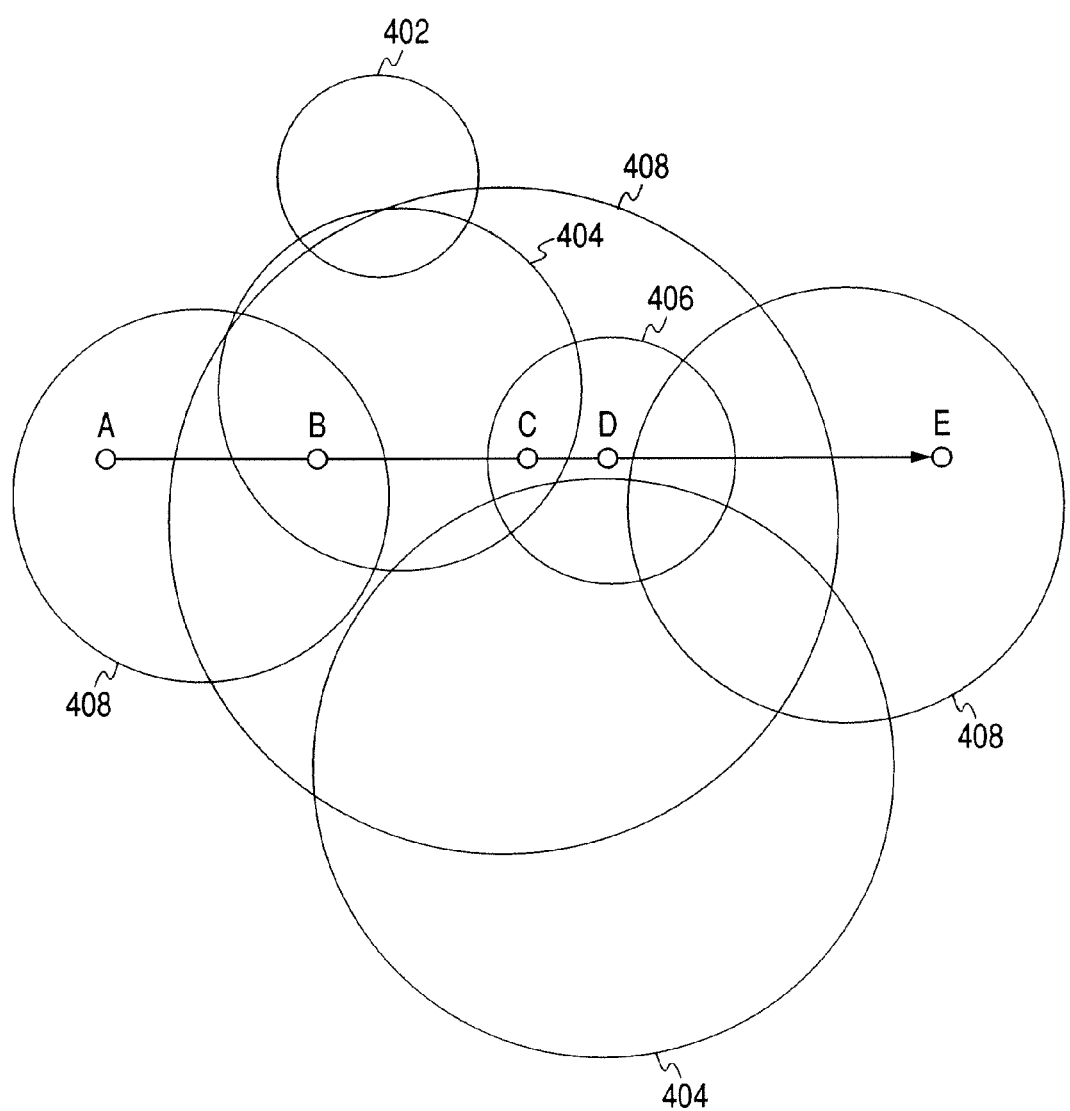
FIG. 3 is a schematic diagram illustrating a state in which a communication interface is switched in accordance with a movement of a mobile communication terminal.

FIG. 3 is a schematic diagram illustrating a state in which the communication interface 102 is switched in accordance with a movement of the mobile communication terminal 100. FIG. 3 shows a case where the mobile communication terminal 100 starts from a point A, passes through points B, C, and D, and reaches a point E. In FIG. 3, a circle represents a communication area covered by each communication network 108. Here, the communication area represented by the same reference numeral is a communication area of the same communication medium. A first communication area 408 is a communication area of a predetermined mobile phone company. A second communication area 402 is a communication area of another mobile phone company. A third communication area 404 is a communication area covered by a predetermined wireless LAN. A fourth communication area 406 is a communication area of a personal hand phone system of a predetermined personal mobile phone company.

When the mobile communication terminal 100 is located at the point A, the mobile communication terminal 100 performs communication via the first communication area 408. When the mobile communication terminal 100 is located at the point B, the mobile communication terminal 100 can perform communication via both the first communication area 408 and the third communication area 404. The mobile communication terminal 100 selects the communication interface 102 corresponding to the first communication area 408 or the third communication area 404 in consideration of a receive status of a radio wave or communication traffic. When the mobile communication terminal 100 is located at the point C, the mobile communication terminal 100 can perform communication via the first communication area 408, the third communication area 404, and the fourth communication area 406. When the mobile communication terminal 100 is located at the point D, the mobile communication terminal 100 can perform communication via the first communication area 408 and the fourth communication area 406. When the mobile communication terminal 100 is located at the point E, the mobile communication terminal 100 performs communication via only the first communication area 408. When the mobile communication terminal 100 selects a desired communication network 108 for communication, an effective communication interface identification address is assigned to the mobile communication terminal 100 by the communication network 108.

Further, when the mobile communication terminal 100 performs communication at the point C via the third communication area 404, the mobile communication terminal 100 selects the communication interface 102 corresponding to the third communication area 404. When the mobile communication terminal 100 moves to the point D, the mobile communication terminal 100 selects the communication interface 102 corresponding to the first communication area 408 or the fourth communication area 406. The mobile communication terminal 100 transmits the data assigned with the terminal identification address and the communication interface identification address to the predetermined communication apparatus 500 via the selected communication interface 102. In addition, when the mobile communication terminal 100 performs communication at the point C via the third communication area 404, the mobile communication terminal 100 may perform communication by switching to communication via the first communication area 408. This is because that, for example, the communication traffic of the third communication area 404 may increase or the status such that the throughput of the communication via the first communication area 408 may become better. At this time, the mobile communication terminal 100 informs the mobile communication managing apparatus 200 of a switching signal for informing communication switching via the third communication area 404 and selects the communication interface 102 corresponding to the first communication area 408. Accordingly, the mobile communication managing apparatus 200 can properly recognize the communication interface 102 through which the mobile communication terminal 100 performs communication.

Figure 4:
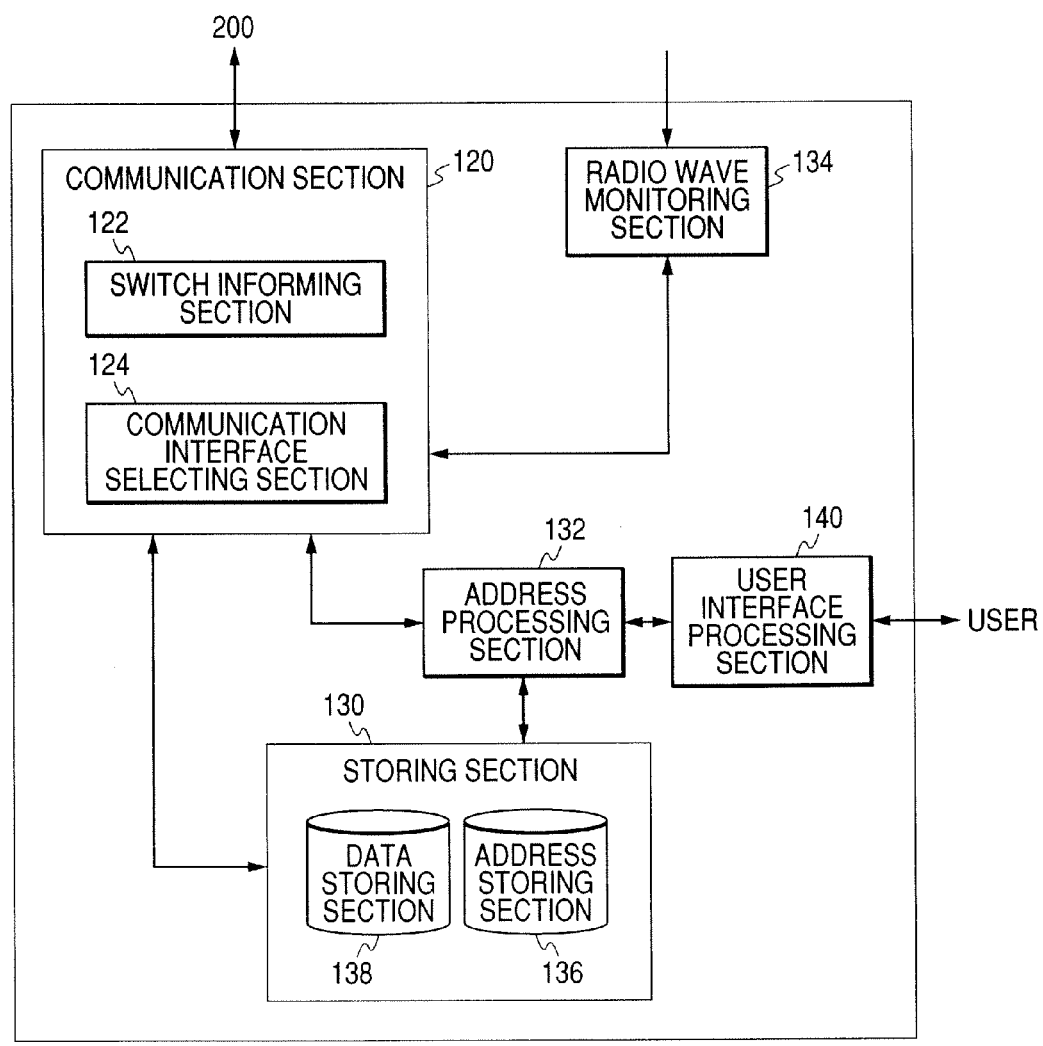
FIG. 4 is a functional block diagram of the mobile communication terminal.
Figure 5:
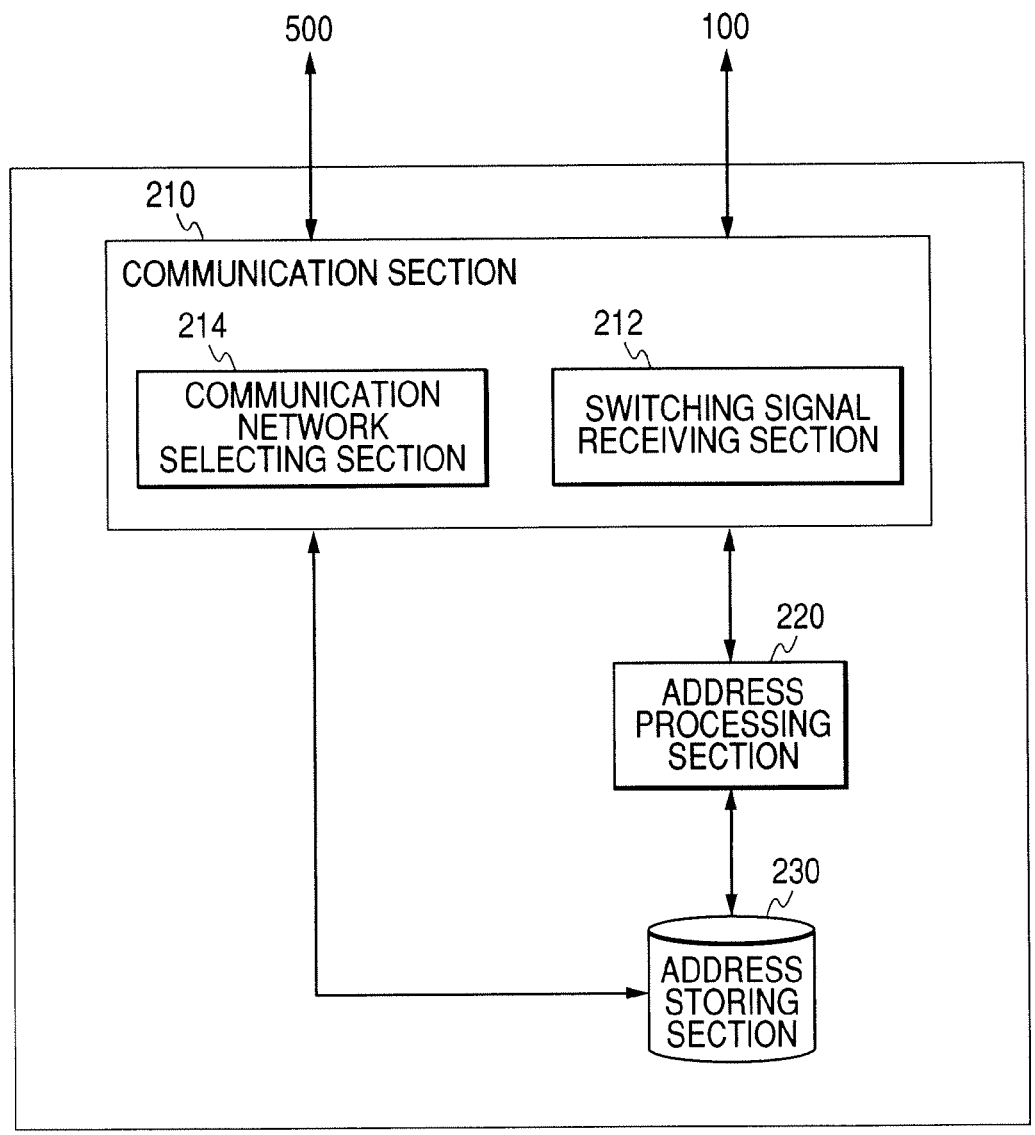
FIG. 5 is a functional block diagram of a mobile communication managing apparatus.

FIG. 4 is a functional block diagram of the mobile communication terminal 100. Respective parts of the mobile communication terminal 100 and the mobile communication managing apparatus 200, which will be described below with reference to FIG. 5 is implemented by an arbitrary combination of hardware and software of a CPU of an arbitrary computer, a memory, a program for implementing the parts of FIG. 4, the program being loaded on the memory, a memory unit such as a hard disk for storing the program, and a network access interface. Various modification of a method for implementing the parts of the mobile communication terminal 100 and various modification of the device can be made as a skilled person recognizes. The following drawings described below shows blocks based on functions, not the configuration based on hardware.

The mobile communication terminal 100 includes a communication section 120, an address processing section 132, a radio wave monitoring section 134, a storing section 130, and a user interface processing section 140. The storing section 130 includes a data storing section 138 and an address storing section 136. The data storing section 138 stores general data to be communicated. The communication section 120 performs a communication processing with the mobile communication managing apparatus 200. The communication section 120 has a switching informing section 122 and a communication interface selecting section 124. The switching informing section 122 informs the mobile communication managing apparatus 200 of the switching signal described above. The communication interface selecting section 124 selects a communication interface 102 for communication. The communication section 120 acquires the communication interface identification address from the communication network 108 via the communication interface 102 selected by the communication interface selecting section 124. The communication section 120 stores the acquired communication interface identification address in the address storing section 136. The address processing section 132 performs processing regarding an address to be assigned to communication data. When the communication section 120 transmits data to the mobile communication managing apparatus 200, the address processing section 132 assigns the data with the terminal identification address and the communication interface identification address. At this time, the address processing section 132 acquires the terminal identification address and the communication interface identification address from the address storing section 136. The radio wave monitoring section 134 monitors a receive status of a radio wave in the communication networks 108 which the mobile communication terminal 100 can access.

The communication interface selecting section 124 may select the communication interface 102 in accordance with the receive status of the radio wave detected by the radio wave monitoring section 134. The user interface processing section 140 performs an input/output process with a user. The user may select the communication interface 102 via the user interface processing section 140.

FIG. 5 is a functional block diagram of the mobile communication managing apparatus 200. The mobile communication managing apparatus 200 has a communication section 210, an address processing section 220, and an address storing section 230. The communication section 210 performs a communication processing with the mobile communication terminal 100. The communication section 210 has a switching signal receiving section 212 and a communication network selecting section 214. The switching signal receiving section 212 receives the switching signal from the communication interface selecting section 124 of the mobile communication terminal 100. The communication network selecting section 214 selects the communication network 108 to transmit data to the mobile communication terminal 100. The terminal identification address and the communication interface identification address are assigned to the data received by the communication section 210 from the mobile communication terminal 100. When the communication section 210 receives the data from the mobile communication terminal 100, the communication section 210 makes the terminal identification address associate with the communication interface identification address, and stores them in the address storing section 230. When the communication section 210 receives the data addressed to the predetermined mobile communication terminal 100 from the communication apparatus 500, the address processing section 220 reads out the communication interface identification address corresponding to the terminal identification address of the mobile communication terminal 100 from the address storing section 230. The communication network selecting section 214 selects the communication network 108 corresponding to the read communication interface identification address and selects a communication interface in accordance with the selected communication network 108. The communication section 210 transmits data via the communication network 108.

FIG. 6 is a diagram showing the data structure stored in the address storing section 136. A terminal number field 232 indicates an ID number for identifying the mobile communication terminal 100. A terminal identification address field 234 indicates the terminal identification address of the mobile communication terminal 100. A first communication interface identification address field 236, a second communication interface identification address field 238, and a third communication interface identification address field 240 indicate the communication interface identification addresses corresponding to the plurality of communication interfaces of the mobile communication terminal 100, respectively. In the mobile communication terminal 100 indicated by a terminal number '1', the terminal identification address '10.1.1.1' is set. The terminal identification address is not modified even though the mobile communication terminal 100 accesses any other communication networks 108, that is, the terminal identification address is a unique address for every mobile communication terminal 100. In the mobile communication terminal 100 indicated by the terminal number '1', a communication interface identification address '168.1.1.6' is set to one of the communication interfaces 102. In the same manner, a communication interface identification address '133.1.1.1' is set to another additional communication interface 102 and a communication interface identification address '192.1.1.1' is set to still another additional communication interface 102. The communication interface identification address, for example, as described with reference to FIG. 3, is an effective address for every communication network 108 which the mobile communication terminal 100 can access. Although the mobile communication terminal 100 indicated by the terminal number '1' includes three communication interface identification addresses, only one of the communication interface identification addresses is actually used during communication. On the other hand, the mobile communication terminal 100 indicated by a terminal number '3' uses a communication interface identification address '168.1.1.3' or a communication interface identification address '192.1.1.3'. The mobile communication terminal 100 indicated by the terminal number '3' cannot use the communication interface 102 corresponding to the second communication interface identification address field 238. This is because, in the mobile communication terminal 100 indicated by the terminal number '3', the communication interface 102 corresponding to the second communication interface identification address field 238 is not valid at a current location.

FIG. 7 is a timing chart illustrating a data transmission process to the communication apparatus 500 from the mobile communication terminal 100 and a data transmission process from the communication apparatus 500 to the mobile communication terminal 100. First, the radio wave monitoring section 134 of the mobile communication terminal 100 detects the receive status of the radio wave (S10). The communication interface selecting section 124 selects the communication interface 102 in accordance with the detected receive status of the radio wave (S12). The communication section 120 assigns transmission data with the terminal identification address and the communication interface identification address, and transmits the data to the mobile communication managing apparatus 200 (S14).

The mobile communication managing apparatus 200 reads out the terminal identification address and the communication interface identification address assigned to the received data, makes the addresses associate with each other, and stores them to the address storing section 136 (S16). The mobile communication managing apparatus 200 transmits the received data to the communication apparatus 500 to be the destination of the received data (S18).

When the communication apparatus 500 transmits data to the mobile communication terminal 100, the communication apparatus 500 recognizes the terminal identification address of the mobile communication terminal 100 based on the data received from the mobile communication terminal 100 via the mobile communication managing apparatus 200. The communication apparatus 500 transmits the data to the mobile communication managing apparatus 200 (S20). The terminal identification address of the mobile communication terminal 100 to be the destination of the data are assigned to the data. The mobile communication managing apparatus 200 reads out the communication interface identification address from the address storing section 230 based on the terminal identification address of the destination assigned to the received data, and specifies the communication interface 102 of the transmission destination (S22). The mobile communication managing apparatus 200 transmits the data to the mobile communication terminal 100 (S24). The mobile communication terminal 100 receives the data via the communication interface 102.

As described above, according to the embodiment, the mobile communication terminal 100 can perform IP communication by switching a plurality of communication systems. Even when the communication network to which the mobile communication terminal 100 belongs changes, the communication network is smoothly switched by the assignment of a new IP address. For example, as described above, in the mobile IP, when the mobile communication terminal 100 changes the communication network, the mobile communication terminal 100 needs to request the location registration to the home agent 400. However, according to the embodiment, since the mobile communication terminal 100 can control switching to another communication network during an idle communication period even while the mobile communication terminal 100 performs communication via the predetermined communication network, a smooth handover can be realized. In addition, since the plurality of communication networks are used, communication options are increased, and communication which does not depend on a predetermined communication service provider can be realized. In addition, when the communication apparatus 500 requests the mobile communication terminal 100 for an ARP (address resolution protocol), the mobile communication management terminal 200 may substitute for the mobile communication terminal 100 so as to respond to the communication apparatus 500. In addition, since the mobile communication terminal 100 can develop the terminal identification address which is a virtual address on a higher layer according to the conventional communication technology, there is an advantage in that the number of processes or cost for the development can be reduced. Further, since an IPsec (security architecture for internet protocol) is used for the IP-VPN, IP security can be easily secured.

Further, since the mobile communication managing apparatus 200 holds a correspondence table for the terminal identification address of the mobile communication terminal 100 and the communication interface identification address, the mobile communication managing apparatus 200 can manage the communication interface 102 used by each mobile communication terminal 100. Since the mobile communication terminal 100 informs the mobile communication managing apparatus 200 that the communication interface 102 is switched during communication, an additional registration operation is not required.

As described, the invention has been described with reference to the above-mentioned embodiment, but the invention is not limited to the above-described embodiment. Various modifications can be used as embodiments according to the invention.

While the invention has been described with reference to the above-mentioned embodiment, it should be understood by the skilled person that various modifications can be made without departing from the scope and spirit of the invention.

INDUSTRIAL APPLICABILITY

According to the invention, a communication interface for transmitting data is selected from a plurality of communication interfaces, and a terminal identification address for identifying a mobile communication terminal and a communication interface identification address for identifying the selected communication interface are provided to transmission data. And then, the data is transmitted via the selected communication interface. Therefore, the industrial applicability is significantly large in the mobile communication terminal having the plurality of communication interfaces.

The invention claimed is:

1. A mobile communication terminal comprising:
a plurality of transceiver interfaces;
a communication interface selecting section which selects a transceiver interface via which the mobile communication terminal transmits data, from the plurality of transceiver interfaces;
a terminal identification address assigning section which assigns a terminal identification address for identifying the mobile communication terminal to the data;
a communication interface identification address assigning section which assigns a communication interface identification address for identifying the selected transceiver interface to the data; and
a transmitting section which transmits the data and the two kinds of addresses assigned to the data via the selected transceiver interface.

2. The mobile communication terminal according to claim 1, further comprising:
a radio wave monitoring section which monitors a status of radio wave reception at a current location,
wherein the communication interface selecting section selects the transceiver interface in accordance with the monitored status of the radio wave reception.

3. A mobile communication managing apparatus comprising:
a mobile communication terminal side receiving section which receives data that is assigned with two kinds of addresses including a mobile communication terminal identification address for identifying a mobile communication terminal having a plurality of transceiver interfaces for different communication methods and a communication interface identification address for identifying a transceiver interface of the mobile communication terminal;
an address storing section which stores an address table in which the mobile communication terminal identification address and the communication interface identification address that are assigned to the received data are associated with each other;
a communication apparatus side transmitting section which transmits the data received by the mobile communication terminal side receiving section to a certain destination;
a communication apparatus side receiving section which receives data being assigned with a mobile communication terminal identification address;
a communication interface detecting section which detects a communication interface identification address that corresponds to the mobile communication terminal identification address being assigned to the data received by the communication apparatus side receiving section based on the address table; and
a mobile communication terminal side transmitting section which transmits the data received by the communication apparatus side receiving section via the detected transceiver interface.

4. A mobile communication system comprising:
a mobile communication terminal including:
a plurality of transceiver interfaces for different communication methods;
a communication interface selecting section which selects a transceiver interface via which the mobile communication system transmits data, from the plurality of transceiver interfaces;
a mobile communication terminal identification address assigning section which assigns a mobile communication terminal identification address for identifying the mobile communication terminal to data;
a communication interface identification address assigning section which assigns a communication interface identification address for identifying the selected transceiver interface to the data; and
a transmitting section which transmits the data and the two kinds of addresses assigned to the data via the selected transceiver interface; and
a mobile communication managing apparatus including:
a mobile communication terminal side receiving section which receives the data from the mobile communication terminal;
an address storing section which stores an address table in which the mobile communication terminal identification address and the communication interface identification address that are assigned to the received data are associated with each other;
a communication apparatus side transmitting section which transmits the data received by the mobile communication terminal side receiving section to a certain destination;
a communication apparatus side receiving section which receives data being assigned with a mobile communication terminal identification address;
a communication interface detecting section which detects a communication interface identification address that corresponds to the mobile communication terminal identification address being assigned to the data received by the communication apparatus side receiving section based on the address table; and
a mobile communication terminal side transmitting section which transmits the data received by the communication apparatus side receiving section via the detected transceiver interface.

5. The mobile communication system according to claim 4, wherein
the mobile communication terminal includes a switching informing section which transmits a switch information signal to the mobile communication managing apparatus when the communication interface selecting section selects another transceiver interface from the plurality of transceiver interfaces, the switch information signal being assigned with the mobile communication terminal identification address and a communication interface identification address corresponding to the transceiver interface to be newly selected, the mobile communication managing apparatus includes a switching signal receiving section which receives the switch information signal, and the address storing section stores the address table in which the mobile communication terminal identification address and the communication interface identification address that are assigned to the switch information signal are associated with each other.

6. A non-transitory computer readable medium storing a program of instruction executable by a computer to perform a function for a mobile communication terminal, the function comprising the steps of:

selecting a transceiver interface via which the mobile communication terminal transmits data, from a plurality of transceiver interfaces;

assigning a terminal identification address for identifying the mobile communication terminal to the data;

assigning a communication interface identification address for identifying the selected transceiver interface to the data; and transmitting the data and the two kinds of addresses assigned to the data via the selected transceiver interface.

7. A non-transitory computer readable, medium storing a program of instruction executable by a computer to perform a function for mobile communication management, the function comprising the steps of:

receiving data that is assigned with two kinds of addresses including a mobile communication terminal identification address for identifying a mobile communication terminal having a plurality of transceiver interfaces for different communication methods and a communication interface identification address for identifying a transceiver interface of the mobile communication terminal from the mobile communication terminal;

storing an address table in which the mobile communication terminal identification address and the communication interface identification address that are assigned to the received data are associated with each other;

transmitting the received data to a certain destination;

receiving data assigned with a mobile communication terminal identification address from a communication apparatus;

detecting a communication interface identification address that corresponds to the mobile communication terminal identification address being assigned to the data received from the communication apparatus based on the address table; and transmitting the data received from the communication apparatus via the detected transceiver interface.

8. A mobile communication method comprising:

selecting a transceiver interface via which the mobile communication terminal transmits data, from a plurality of transceiver interfaces;

assigning a terminal identification address for identifying a mobile communication terminal to data;

assigning a communication interface identification address for identifying the selected transceiver interface to the data;

storing an address table in which the assigned terminal identification address and the assigned communication interface identification address are associated with each other; and transmitting the data and the two kinds of addresses assigned to the data to a certain destination.

9. The mobile communication method according to claim 8, further comprising:

receiving data being assigned with the terminal identification address;

detecting the communication interface identification address that corresponds to the terminal identification address for identifying the mobile communication terminal based on the address table; and transmitting the received data via the detected transceiver interface.

* * * * *